United States Patent
Biegert et al.

(10) Patent No.: US 7,022,427 B1
(45) Date of Patent: Apr. 4, 2006

(54) MEMBRANE FOR A FUEL CELL AND METHOD FOR PRODUCING THE SAME

(75) Inventors: Hubertus Biegert, Unterkirnach (DE); Peter Britz, Frankenberg (DE); Gabor Toth, Illertissen-Jedesheim (DE); Peter Urban, Amberg (DE)

(73) Assignee: Ballard Power Systems Inc., Burnaby (CA)

( * ) Notice: Subject to any disclaimer, the term of this patent is extended or adjusted under 35 U.S.C. 154(b) by 262 days.

(21) Appl. No.: 10/069,609

(22) PCT Filed: Aug. 30, 2000

(86) PCT No.: PCT/EP00/08465

§ 371 (c)(1),
(2), (4) Date: Jun. 18, 2002

(87) PCT Pub. No.: WO01/20700

PCT Pub. Date: Mar. 22, 2001

(30) Foreign Application Priority Data

Sep. 10, 1999 (DE) ................................ 199 43 244

(51) Int. Cl.
*H01M 8/00* (2006.01)
*H01M 6/14* (2006.01)

(52) U.S. Cl. ........................................ 429/33; 429/300

(58) Field of Classification Search ................ 429/30, 429/33, 300, 303
See application file for complete search history.

(56) References Cited

U.S. PATENT DOCUMENTS

| 5,433,876 | A | * | 7/1995 | Fauteux et al. ............ 252/62.2 |
| 5,766,787 | A | | 6/1998 | Watanabe et al. ............. 429/33 |
| 6,242,135 | B1 | * | 6/2001 | Mushiake ................... 429/304 |

FOREIGN PATENT DOCUMENTS

| DE | 4312126 | 10/1994 |
| EP | 0503688 | 9/1992 |
| EP | 0631337 | 12/1994 |
| EP | 0718903 | 6/1998 |
| EP | 0926754 | 6/1999 |
| WO | 9519222 | 7/1995 |
| WO | 9811614 | 3/1998 |

* cited by examiner

*Primary Examiner*—Patrick Joseph Ryan
*Assistant Examiner*—Julian Mercado
(74) *Attorney, Agent, or Firm*—Seed IP Law Group PLLC

(57) ABSTRACT

The invention relates to an ion-conductive polymer membrane for a fuel cell, whereby the polymer membrane is configured from a polymer-forming hydrocarbon material and to a method for producing the same. The membrane also has a metal-containing gel which has been hydrolysed and/or condensed from a metal alkoxide starting material and which is deposited in the polymer and/or is chemically bonded to the polymer. The proportion of metal alkoxide by weight, in relation to the membrane, lies between 25% and 1%.

6 Claims, 1 Drawing Sheet

MEMBRANE FOR A FUEL CELL AND METHOD FOR PRODUCING THE SAME

BACKGROUND OF THE INVENTION

The present invention relates to an ion-conducting polymer membrane for a fuel cell, the polymer being formed of a polymer-forming hydrocarbon material, and to a method for producing such a membrane.

Ion-conducting polymer electrolyte membranes are used in fuel cells as membrane between anode and cathode. In this connection, conventional membranes have a minimum thickness of, typically, over 50 μm for the purpose of sufficient mechanical stability. On the other hand, the ionic conductivity of the membrane is limited by the thickness of the membrane.

If the intention is to make membranes as thin as possible, then it has been proposed for the ion-conducting polymer to be deposited as a thin layer on a carrier which is used as electrode. Such a membrane/electrode unit is described, for example, in European Patent Application EP-A-0 718 903.

Moreover, World Patent Application WO-A-95/19222 describes microcomposite polymers which are produced by mixing a solution of a polymer-forming hydrocarbon material, for example the fluorinated hydrocarbon which is available under the trade name Nafion®, with a metal alkoxide such as tetramethoxysilane, and subjecting it to a sol-gel process. In this context, the proportions of polymer-forming hydrocarbon material and of metal alkoxide are selected such that, in relation to the manufactured microcomposite polymer product, the proportion of fluorinated hydrocarbon material by weight is at most 80% and, accordingly, the proportion of metal alkoxide by weight is at least about 20%.

Subsequent to a treatment at elevated temperature, these polymers feature an inner of a metal oxide skeleton which gives rise to marked increase in the active surface of the polymer. The temperatures used are, at any rate, partially so high that they cannot be used for the polymer electrolyte membranes used in fuel cells. These polymers are said to possess a marked porosity featuring pore diameters of up to 1000 nm.

Unexamined European Laid-Open Patent Application EP 0 530 688 A2 describes a method for producing a fluorinated polymer with sulfonic acid side groups on a substrate, in which the substrate is wetted with a solution or dispersion containing the fluorinated polymer material whereupon the solvent or dispersant is driven off and the so obtained product is heated above the glass transition temperature of the polymer to make the polymer insoluble. The temperatures used in the process lie preferably between 150° C. and 300° C.

Unexamined German Laid-Open Patent Application DE 43 12 126 A1 described a gas diffusion electrode, for example for fuel cells, which includes a gas-permeable porous diffusion barrier which contains an electrically conductive catalyst in a finely divided form and is coated with a semipermeable membrane on its inner side. The membrane layer is composed, for example, of polysulfone, polyvinylidene fluoride, polyamide, or polyhydantoin, has a thickness of between 100 μm and 700 μm and can additionally contain fillers, preferably in a higher proportion compared to the polymer content. To manufacture the membrane, the filler, for example, titanium dioxide, zinc oxide, monocrystalline cellulose, silicic acid or aerosils (Degussa Company), is dispersed into a polymer solution which is then degassed in a vacuum and, upon application onto a substrate, is coagulated in water and subsequently washed and dried. A membrane which is made in a similar manner from a polymer-forming, perfluoro sulfonic acid containing solution, for example Nafion®, with introduced silicon dioxide particles, for example in the form of Aerosil 200 (Degussa Company) is disclosed in Unexamined European Laid-Open Patent Application EP 0 926 754 A1, both an amorphous and a crystalline phase being formed in this membrane via a controlled thermal treatment at a temperature above the glass transition temperature.

SUMMARY OF THE INVENTION

The technical problem underlying the present invention is to provide an ion-conducting polymer electrolyte membrane of the type mentioned at the outset which can be manufactured with comparatively small outlay and, if required, in a comparatively small thickness in a mechanically stable, self-supporting form as well as to provide a manufacturing method which is suitable for this.

The membrane according to the present invention contains, in addition to the ion-conducting polymer, a metal-containing gel which is hydrolyzed and/or condensed from a metal alkoxide starting material and which is included in the polymer and/or is chemically bonded to the polymer. The proportion of metal alkoxide, in relation to the membrane, lies between 25% and 1%. A proportion of metal alkoxide by weight of more than 25% results in a membrane which is too brittle for a self-supporting membrane. A proportion of metal alkoxide by weight of less than 1% results in a membrane which is too soft for a self-supporting membrane.

A preferred metal alkoxide is tetraethoxysilane; preferred polymer-forming hydrocarbon materials are fluorinated hydrocarbons such as Nafion®.

The membrane according to the present invention can be manufactured in a self-supporting form in a thickness of only about 51 μm, greater thicknesses of, for example, up to about 100 μm being possible as well.

The manufacturing method according to the present invention includes the formation of the membrane via a process which is similar to a conventional sol-gel process, the solution of a polymer-forming hydrocarbon material and the metal alkoxide being converted to a composite gel. In the process, a metal-containing gel forms from the metal alkoxide by hydrolysis and/or condensation, the gel having a metal-containing lattice structure which gives the membrane a certain desired stability without the membrane, on the other hand, being too brittle.

It is a particular advantage that the proton conductivity and the rewetting of the membrane are markedly improved.

In an expedient embodiment of the present invention, provision is made to add a filler, such as the filler which is available under the trade name Aerosil P200 from the Degussa Company. Via this addition of filler, it is possible for the pore structure of the membrane to be advantageously changed to the effect that the water transport through the membrane is improved and that water can be retained in the membrane noticeably better. Because of this, the membrane is immediately wetted already when the fuel cell begins to operate, ensuring optimum ionic conductivity right from the beginning. Moreover, the product water formed on the cathode side during fuel cell operation is sufficient for wetting the polymer electrolyte membrane so that an additional addition of water to the reaction gasses of the fuel cell can be omitted and, accordingly, it is not necessarily required to carry along an additional water tank in the case of a mobile application in fuel cell vehicles.

BRIEF DESCRIPTION OF THE DRAWINGS

Further advantages and refinements of the present invention follow from the description, in which.

DETAILED DESCRIPTION

Figure 1:
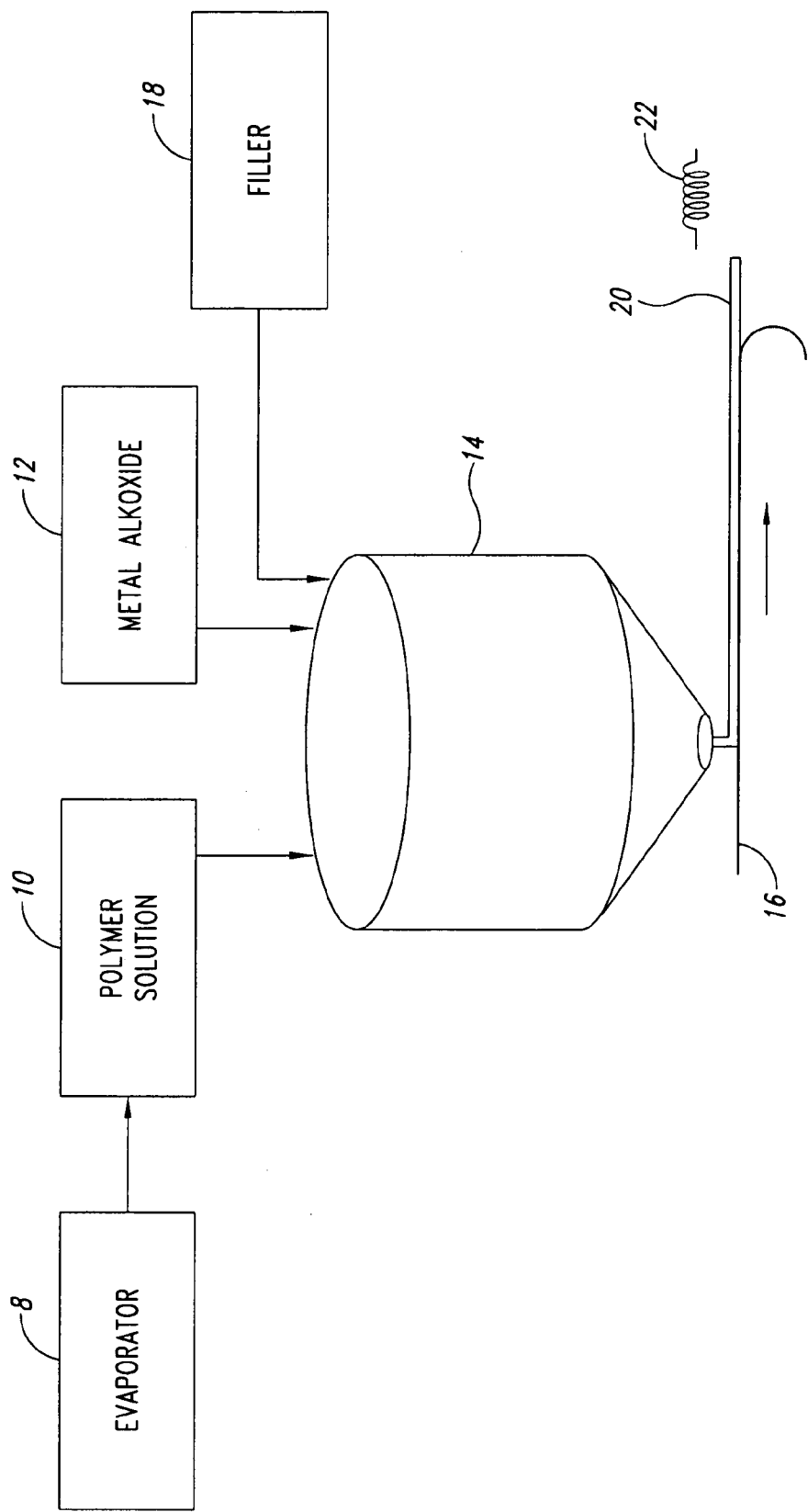
FIG. 1 shows schematically the manufacturing process for one emboiment of the membrane of the present invention. It is understood that the aforementioned features and those which are still to be explained in the following can be used not only in the combinations which are in each case specified but also in other combinations or alone without leaving the scope of the present invention.

In the following, an advantageous embodiment of the present invention will be described, in particular, the manufacture of a self-supporting polymer electrolyte membrane according to the present invention with the aid of a sol-gel like process.

A commercial polymer solution of 5% of Nafion® in isopropanol/water (Nafion® 111, manufacturer: DuPont de Nemours) 10 is mixed with a metal alkoxide 12, preferably tetraethoxysilane, for a short time at room temperature in a mixer 14 and spread onto an intermediate carrier 16. Optionally, it is also possible to concentrate the solution by treating the solution in an evaporator 8, preferably a rotary film evaporator. Optionally, a filler 18 is added, for example, the filler Aerosil P200 sold by the Degussa Company.

The water contained in the polymer solution reacts with the metal alkoxide through hydrolysis and condensation, forming a gel in which the alkoxide group at the metal (or silicon) is replaced with oxygen. The membranes 20 are easily removed from the carrier 16 and exist now as self-supporting membranes. Subsequently, the polymer is transformed at a temperature of 120° C. by a schematically-shown heater 22 in such a manner that proton-conducting properties can develop; preferably, the membrane is exposed to the temperature for one hour. Unlike the usual sol-gel process, the annealing step at high temperature is missing so that, besides the metal oxide skeleton, gel still exists in the polymer.

Thus, it is possible to manufacture membranes in a self-supporting form in a thickness of, for example, up to 50 µm. Preferred proportions of the involved materials will be specified in the following, the indicated percentages each being weight-related. In this context, the sum of the polymer/metal alkoxide portions together should nominally amount to 100% (percentage by weight), independently of whether further additives exist in the membrane. Membranes which are accordingly manufactured with 95% of Nafion® and 5% of tetraethoxysilane can, for example, be produced already in thicknesses in the range between only about 5 to 15 µm, preferably in thicknesses around 10 µm. These self-supporting membranes can be subjected to thermal and mechanical stress without difficulty and are well-suited for use in a fuel cell. Depending on the application, a membrane thickness of up to 40 µm or also up to 100 µm can be desired. In these thicker membranes, the metal alkoxide content can be reduced down to 1 percent by weight. In the case of thinner layers, a slightly higher proportion of metal alkoxide is favorable to attain sufficient mechanical stability.

It has turned out that in the case of a metal alkoxide content above approximately 10%, the membranes become increasingly brittle whereas in the case of a metal alkoxide content below approximately 1%, the membranes become increasingly soft and inferior in their mechanical loading capacity. In this connection, given comparable mechanical stability, the metal alkoxide content can be smaller for thicker membranes than for thinner membranes.

Accordingly, a metal alkoxide content of at most 25% and at least 1% is preferred, particular preference being given to a range of at most 7% and at least 3%. In the case of thicknesses of approximately 30 µm to 50 µm and more, the metal alkoxide contents can perfectly be less than 3% as well.

In relation to the membrane, a preferred weight ratio between polymer and metal alkoxide lies in the range between 75% polymer/25% metal alkoxide and 99% polymer/1% metal alkoxide.

In relation to the membrane, a further preferred weight ratio between polymer and metal alkoxide lies in the range between 90% polymer/10% metal alkoxide and 99% polymer/1% metal alkoxide.

The metal alkoxide content influences not only the stability and/or brittleness of the membrane but also the hydrophobicity of the membrane which allows the membrane to be removed from the intermediate carrier during manufacture. Therefore, the method is also advantageous for thicker membranes in the case of which the manufacture of self-supporting membranes as such is not problematic.

A sol-gel reaction as described in the related art cited at the outset, either due to the high temperatures used and/or because of the considerably higher proportions of metal alkoxides, results in very brittle and also porous polymer composites which are not suitable for a self-supporting thin membrane for a fuel cell according to the present invention.

Further preferred membranes according to the present invention can be manufactured using the sol-gel process by using other metal alkoxides, for example titanium- or zirconium-containing metal alkoxides in lieu of tetraethoxysilane. Inorganic components, preferably $SiO_2$, $TiO_2$, $ZrO_2$ and/or $Al_2O_3$ can also be incorporated in such a membrane. In this manner, besides the mechanical properties, other properties of membranes can also be selectively influenced, preferably the selectivity of the membrane, for instance, for protons and/or the permeability to substances such as $H_2O$ and/or methanol which are transported through the membrane and/or the water balance of the membrane.

As for the water balance of the membrane, an improvement thereof is possible especially also via the mentioned addition of the filler. In this connection, the filler, such as Aerosil P200, is preferably added in a proportion by weight of between 0.5% and 1% in relation to the membrane. It influences the pore structure of the membrane in such a manner that the water transport through the membrane is markedly improved and that water can be retained in the membrane markedly better. In this manner, the membrane is sufficiently wetted immediately when the fuel cell begins to operate, ensuring optimum ionic conductivity. The product water that arises on the cathode side during fuel cell operation is sufficient to maintain the membrane wet without having to add additional water to the reaction gasses. Then, it is not required to carry along an additional water tank for this purpose for the fuel cells.

The filler Aerosil P200 can be added to the reaction mixture prior to the gel formation process, for example in dispersed form in water/isopropanol. Then, the filler is inserted in the membrane, enlarging its pore structure. Moreover, it is hydrophilic and thereby promotes the ionic conductivity of the, in this case, ternary composite membrane.

The invention claimed is:

1. A self-supporting, ion-conducting polymer membrane for a fuel cell, comprising:
   an ion-conducting polymer made of a polymer-forming hydrocarbon material; and
   a metal-containing gel hydrolyzed and/or condensed from a metal alkoxide, the metal-containing gel being located within the polymer and/or chemically bonded to the polymer;
   wherein the weight ratio of the metal alkoxide to the membrane is between 25% and 1%.

2. The ion-conducting polymer membrane as recited in claim 1, wherein the membrane contains from 75% to 99% of polymer-forming hydrocarbon material by weight and from 25% to 1% of metal alkoxide by weight.

3. The ion-conducting polymer membrane as recited in claim 1, wherein a thickness of the membrane is 100 μm or less.

4. The ion-conducting polymer membrane as recited in claim 3 wherein the thickness of the membrane is between 5 and 30 μm.

5. The ion-conducting polymer membrane as recited in claim 1, further comprising a filler.

6. The ion-conducting polymer membrane as recited in claim 5, wherein the membrane contains between 0.5% and 1% by weight filler.

* * * * *